2,806,523

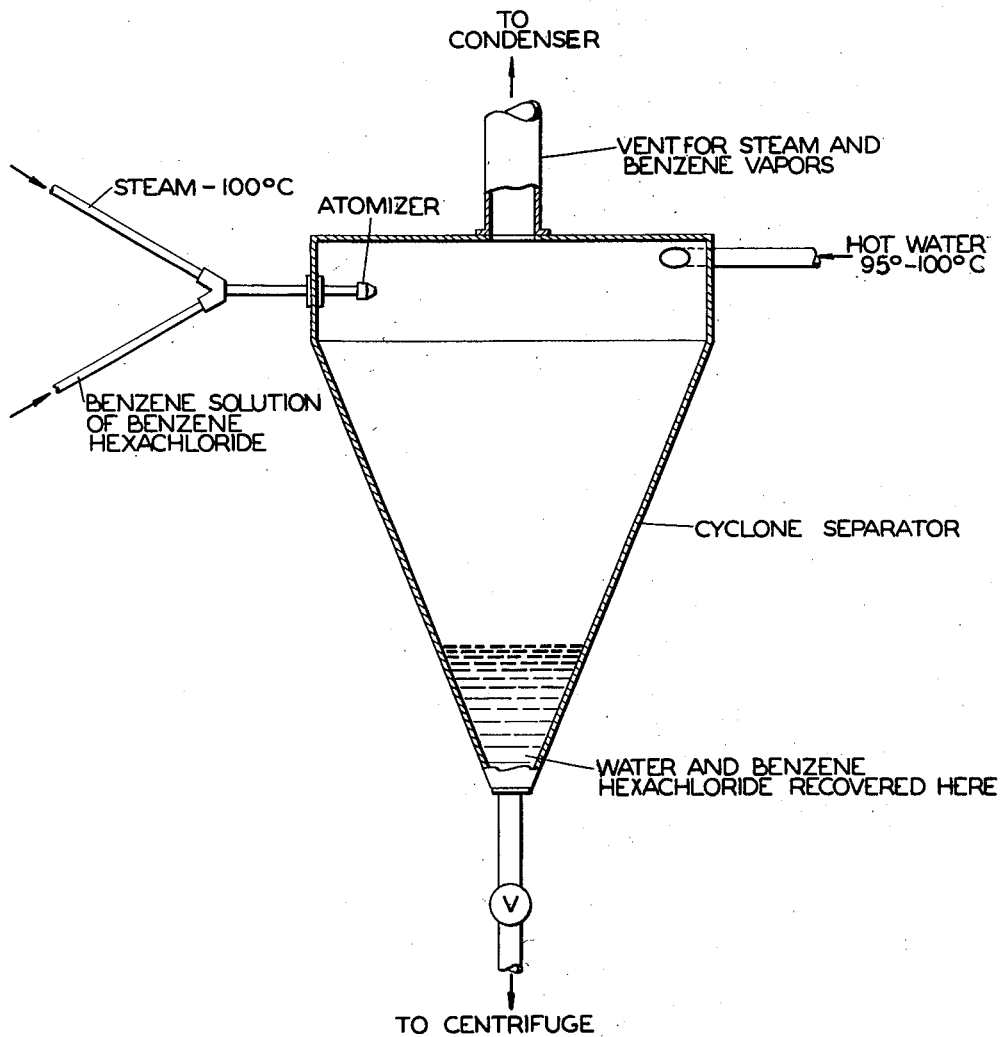

PROCESS FOR PRODUCING FINELY DIVIDED BENZENE HEXACHLORIDE

Bernard Henry Nicolaisen, Lewiston, N. Y., assignor to Olin Mathieson Chemical Corporation, a corporation of Virginia Application June 3, 1952, Serial No. 291,574

2 Claims. (Cl. 159—48)

My invention relates to a process for preparing benzene hexachloride in finely divided form from a liquid solution of benzene hexachloride. The novel process of my invention provides a particularly advantageous method whereby benzene hexachloride in finely divided form can be prepared directly from a crude reaction mixture such as obtained by the addition chlorination of benzene, usually a dilute solution of benzene hexachloride in benzene.

In the usual method of manufacturing benzene hexachloride, benzene is treated with a relatively small proportion of chlorine with illumination to cause the chlorine to react additively with the benzene. In order to avoid substitution chlorination and the formation of various by-products, the conventional technique is to convert only a small fraction of the benzene to benzene hexachloride before separating the benzene hexachloride and benzene. Usually distillation serves this purpose and the overhead benzene is recycled to the reaction while the residual benzene hexachloride is freed from traces of benzene. In the conventional method using steam or vacuum distillation to remove the residual unreacted benzene, it is necessary to maintain the benzene hexachloride in a molten condition at a temperature of about 150° C. Considerable darkening and decomposition of the product occurs under these conditions. The liquid benzene hexachloride which is obtained from this distillation is solidified in the form of blocks or flakes. In either case, it is necessary to reduce the particle size of the product by grinding in order to produce finely divided benzene hexachloride for use as an insecticide. The benzene hexachloride usually contains impurities which under the conditions of grinding make it sticky and difficult to reduce to finely divided form.

My process is particularly advantageous because it provides a method whereby finely divided benzene hexachloride is produced directly from the reactor solution of benzene hexachloride in benzene without the high temperature distillation and subsequent grinding operations described above and therefore produces a finely divided benzene hexachloride product in increased yield and with much better color characteristics at reduced cost.

The single figure in the sheet of drawings illustrates one example of an embodiment for practicing the process of this invention.

The process of my invention for producing finely divided benzene hexachloride from a liquid solution of benzene hexachloride comprises atomizing a mixture of the benzene hexachloride solution and steam into a cyclone separator, removing the vaporized solvent and steam from the separator through a vapor outlet, and recovering the finely divided benzene hexachloride formed in the separator from the separator. The quantity of steam admixed with the benzene hexachloride solution must be at least sufficient to supply the heat necessary to vaporize the solvent of the solution.

In practicing my present invention, either the dilute solution of benzene hexachloride in benzene which is obtained directly from the reactor or a partially concentrated solution is mixed with steam and the mixture is sprayed through an atomizer directly into a cyclone separator. The heat of vaporization of the benzene is supplied by the steam admixed with the benzene solution feed. Under these conditions, the solution is dispersed in small droplets and the benzene is evaporated quickly from each droplet. The residue of benzene hexachloride is in finely divided form and is removed from the cyclone separator without aggregation. Water vapor and solvent vapors are removed from the top of the separator and condensed. Liquid benzene is separated from the water and returned to the benzene hexachloride reactor while the water is discarded.

When introducing the mixture of steam and benzene solution into the cyclone separator, I prefer to divide the benzene solution of benzene hexachloride into droplets having a very small particle size preferably about 40 microns in diameter but this may vary from 20 to 500 microns depending on the desired degree of fineness in the product and on the availability of adequate equipment.

Hot water, at a temperature of about 95–100° C., may also be introduced with advantage near the top of the cyclone separator at a point removed from the spray or jet at the same time as the mixture of steam and benzene solution of benzene hexachloride. Due to the vaporization of benzene from the droplets their temperature may not rise above about 80° C. and the particles separated out on the walls of the cyclone separator may contain residual solvent. The addition of the hot water at about 95–100° C. to the separator serves to steam distill residual solvent from the particles and they are obtained suspended in water and substantially free of solvent. The hot water also serves to wash down the walls of the separator and produce an effluent of finely divided benzene hexachloride suspended in water. This suspension is then separated by filtration or centrifuging to obtain benzene hexachloride in finely divided form. It is advantageous to reheat and return to the cyclone separator as hot wash water the water separated from the finely divided product.

While the process of my invention has been described in terms of producing a finely divided benzene hexachloride from a solution of crude benzene hexachloride in benzene such as is obtained directly from a benzene hexachloride reactor, it is equally applicable to the production of a finely divided product from any liquid solution of either benzene hexachloride or any of the individual isomers of benzene hexachloride in a volatile solvent. For example, my invention provides an advantageous process for producing a finely divided benzene hexachloride rich in the gamma isomer from gamma-rich extracts such as are produced by methanol extraction of crude benzene hexachloride. Such products are preferred because of their increased gamma isomer concentration, and therefore increased insecticidal activity, and my process provides for the production of such finely divided products at much reduced cost.

My invention will be further described in the following illustrative example which is not intended to be limiting.

Example

A benzene solution of benzene hexachloride containing about 20 percent of the latter together with steam at a temperature of 100° C. was charged to a cyclone separator through an atomizer. About 0.5 pound of steam was used per pound of solution. Sufficient hot water at 95–100° C. was also introduced into the top of the separator to reduce the benzene content of the finely divided benzene hexachloride product to about 1%. About 2 pounds of hot water per pound of finely divided product were employed. This hot water also served to wash down the walls of the separator. The benzene-water vapor mixture removed overhead from the separator was condensed and the benzene separated. Substantially all of the benzene of the solution charged to the separator was thus recovered and recycled to the reaction zone. The suspension of finely divided benzene hexachloride in hot water from the separator was charged to a centrifuge. Water separated therefrom was reheated and returned to the separator while solid benzene hexachloride was removed from the centrifuge as a finely divided product. Substantially all of the benzene hexachloride content of the original benzene solution of benzene hexachloride was recovered as a finely divided product.

I claim:

1. A process for producing finely divided benzene hexachloride from a liquid solution of benzene hexachloride in benzene which comprises atomizing into a cyclone separator the benzene hexachloride solution with steam at about 100° C., the quantity of steam being sufficient to supply heat necessary to vaporize the benzene, introducing hot water at about 95–100° C. into the top of the separator, the quantity of hot water being sufficient to vaporize residual benzene from the benzene hexachloride, removing the benzene vapor vaporized by the steam and the hot water from the separator and recovering the benzene hexachloride from the resulting aqueous benzene hexachloride suspension at the bottom of the separator.

2. A process for producing finely divided benzene hexachloride from a benzene solution containing about 20 percent benzene hexachloride which comprises atomizing into a cyclone separator the benzene solution with steam at a temperature of about 100° C., the ratio of steam to solution being about 0.5 pound of steam to one pound of solution, washing down the walls of the separator by introducing hot water at about 95–100° C. into the top of the separator, the ratio of hot water to benzene hexachloride being about two pounds of hot water to one pound of benzene hexachloride, removing benzene vapor formed by the steam and the hot water from the separator, removing the resulting aqueous suspension of finely divided benzene hexachloride from the bottom of the separator, and recovering the benzene hexachloride from the suspension.

References Cited in the file of this patent

UNITED STATES PATENTS

| | | |
|---|---|---|
| 1,215,889 | Stutzke | Feb. 13, 1917 |
| 1,308,403 | Doonar | July 1, 1919 |
| 1,771,140 | Novotny | July 22, 1930 |
| 2,310,650 | Peebles | Feb. 9, 1943 |
| 2,564,406 | Neher et al. | Aug. 14, 1951 |
| 2,622,105 | Miller et al. | Dec. 16, 1952 |